United States Patent
Li

(10) Patent No.: US 12,194,856 B2
(45) Date of Patent: Jan. 14, 2025

(54) HYBRID POWER TRAIN STRUCTURE IN OFF-ROAD VEHICLE

(71) Applicant: Zhejiang CFMOTO Power Co., Ltd., Zhejiang (CN)

(72) Inventor: Jiajun Li, Hangzhou (CN)

(*) Notice: Subject to any disclaimer, the term of this patent is extended or adjusted under 35 U.S.C. 154(b) by 0 days.

(21) Appl. No.: 18/111,818

(22) Filed: Feb. 20, 2023

(65) Prior Publication Data

US 2023/0202286 A1    Jun. 29, 2023

Related U.S. Application Data

(63) Continuation of application No. 16/937,839, filed on Jul. 24, 2020, now Pat. No. 11,607,947.

(30) Foreign Application Priority Data

| Jul. 25, 2019 | (CN) | ......................... 201910676475.5 |
| Jul. 25, 2019 | (CN) | ......................... 201910676483.X |
| Jul. 25, 2019 | (CN) | ......................... 201921185770.2 |

(51) Int. Cl.
| *B60K 6/543* | (2007.10) |
| *B60K 6/24*  | (2007.10) |
(Continued)

(52) U.S. Cl.
CPC ............... *B60K 6/543* (2013.01); *B60K 6/24* (2013.01); *B60K 6/26* (2013.01); *B60K 6/28* (2013.01);
(Continued)

(58) Field of Classification Search
CPC ..... B60K 6/40; B60K 6/36; B60K 6/46; B60K 6/48; B60K 6/52; B60Y 2200/92
See application file for complete search history.

(56) References Cited

U.S. PATENT DOCUMENTS

| 5,846,155 A | * | 12/1998 | Taniguchi | ............... B60L 58/13 |
|  |  |  |  | 903/910 |
| 6,007,443 A | * | 12/1999 | Onimaru | ................. B60L 50/61 |
|  |  |  |  | 475/5 |

(Continued)

FOREIGN PATENT DOCUMENTS

| CN | 2513818 Y | 10/2002 |
| CN | 201902828 U | 7/2011 |

(Continued)

*Primary Examiner* — Erez Gurari
(74) *Attorney, Agent, or Firm* — Shewchuk IP Services, LLC; Jeffrey D. Shewchuk

(57) ABSTRACT

A hybrid power train structure for off-road vehicles (ATVs, UTVs and SSVs) uses an internal combustion engine ("ICE") rotating a crankshaft through a continuously variable transmission ("CVT") as a primary source of locomotion torque, but also includes a driving/generator motor which, in certain established conditions, can either provide an additional or alternative source of locomotion torque or can harvest electricity from the torque created by the internal combustion engine. The driving/generator motor is an axial flux motor of small size for its relative torque output, which can either be directly coupled to the CVT output shaft or, when additionally used as a starter motor for the ICE in an automatic ICE starting and stopping routine.

19 Claims, 5 Drawing Sheets

(51) Int. Cl.
  *B60K 6/26* (2007.10)
  *B60K 6/28* (2007.10)
  *B60L 15/20* (2006.01)
  *F16H 9/16* (2006.01)

(52) U.S. Cl.
  CPC ............... *B60L 15/20* (2013.01); *F16H 9/16* (2013.01); *B60K 2006/268* (2013.01); *B60Y 2200/20* (2013.01); *B60Y 2200/92* (2013.01); *B60Y 2300/192* (2013.01); *B60Y 2400/112* (2013.01); *B60Y 2400/46* (2013.01); *B60Y 2400/607* (2013.01)

(56) References Cited

U.S. PATENT DOCUMENTS

| | | | |
|---|---|---|---|
| 6,359,404 B1* | 3/2002 | Sugiyama | B60W 20/00 318/432 |
| 6,367,570 B1* | 4/2002 | Long, III | B60W 10/08 60/705 |
| 7,520,351 B2 | 4/2009 | Uchiasai et al. | |
| 9,827,971 B2* | 11/2017 | Suzuki | B60L 53/126 |
| 10,118,477 B2* | 11/2018 | Borud | B60K 6/26 |
| 2004/0009842 A1* | 1/2004 | Inada | B60K 6/44 180/65.23 |
| 2004/0055800 A1 | 3/2004 | Katou et al. | |
| 2004/0124021 A1* | 7/2004 | Shirai | B60K 17/06 903/910 |
| 2006/0180363 A1 | 8/2006 | Uchisasai et al. | |
| 2006/0247086 A1* | 11/2006 | Watanabe | B60K 6/387 475/5 |
| 2007/0204594 A1* | 9/2007 | Ishii | B60W 10/26 60/299 |
| 2009/0192013 A1* | 7/2009 | Kim | H02K 7/12 477/3 |
| 2010/0152982 A1 | 6/2010 | Bowman et al. | |
| 2010/0324762 A1 | 12/2010 | Imaseki et al. | |
| 2011/0319225 A1* | 12/2011 | Oota | B60W 20/30 180/65.265 |
| 2013/0191012 A1 | 7/2013 | Hirotsu et al. | |
| 2016/0243958 A1* | 8/2016 | Miller | B60L 53/14 |
| 2016/0281628 A1* | 9/2016 | Miyaji | B60K 6/445 |
| 2016/0368474 A1* | 12/2016 | Komuro | B60K 6/387 |
| 2016/0375892 A1* | 12/2016 | Kim | B60K 6/442 701/22 |
| 2017/0120899 A1* | 5/2017 | Sugimoto | B60K 6/52 |
| 2017/0282904 A1* | 10/2017 | Morita | B60K 6/387 |
| 2017/0282910 A1* | 10/2017 | Kim | B60W 20/50 |
| 2017/0299053 A1* | 10/2017 | Kobayashi | B60K 6/547 |
| 2018/0111604 A1* | 4/2018 | Inoue | B60K 6/48 |
| 2018/0257478 A1* | 9/2018 | Haka | B60K 6/543 |
| 2018/0264928 A1* | 9/2018 | Takaki | B60L 50/15 |
| 2018/0326834 A1* | 11/2018 | Kumar | B60W 10/08 |
| 2019/0153990 A1 | 5/2019 | Lebreux et al. | |
| 2020/0094810 A1 | 3/2020 | Moreland et al. | |
| 2020/0122562 A1* | 4/2020 | Zhang | B60K 6/387 |
| 2020/0238974 A1* | 7/2020 | Shimizu | B60W 10/06 |
| 2020/0361445 A1* | 11/2020 | Mochizuki | B60W 10/04 |
| 2021/0023933 A1* | 1/2021 | Li | B60K 6/52 |
| 2021/0053435 A1* | 2/2021 | Ito | B60K 6/485 |
| 2022/0080822 A1* | 3/2022 | Dong | F16H 9/26 |
| 2023/0391180 A1* | 12/2023 | Kuji | B60W 10/111 |

FOREIGN PATENT DOCUMENTS

| | | |
|---|---|---|
| CN | 203362898 U | 12/2013 |
| CN | 204801486 U | 11/2015 |
| CN | 107020944 A | 8/2017 |
| CN | 209650052 U | 11/2019 |

* cited by examiner

HYBRID POWER TRAIN STRUCTURE IN OFF-ROAD VEHICLE

CROSS-REFERENCE TO RELATED U.S. APPLICATION(S)

This is a continuation of U.S. patent application Ser. No. 16/937,839 filed Jul. 24, 2020, now granted as U.S. Pat. No. 11,607,947.

FIELD OF THE INVENTION

The invention relates to the technical field of off-road or all-terrain vehicles, including straddle-type all-terrain vehicles, utility vehicles, and side-by-side off-road vehicles, all such vehicles having a width of about 70 inches or less. The present invention particularly relates to hybrid power train structures to drive the wheels of such vehicles using a one or two cylinder internal combustion engine and/or an electrically powered motor.

BACKGROUND OF THE INVENTION

Utility vehicles ("UVs"), side-by-side off-road vehicles ("SSVs"), and straddle-type all terrain vehicles ("ATVs") commonly utilize a one or two cylinder internal combustion engine ("ICE") that provides the torque necessary for locomotion over a wide variety of terrains, including over roads, unpaved trails, fields, rocks, etc. Such vehicles commonly use a continuously variable transmission ("CVT") having a belt running between two pulleys to change the torque output by the ICE by an appropriate, continuously adjustable ratio to the desired rotational speed, and then additionally use a gearing arrangement to optionally change rotational direction and/or further change rotational speed between the CVT output shaft and drive shaft and the half-shafts driving the wheels.

Electric motors have long been used on off-road vehicles as starter motors for the ICE, including on off-road vehicles having a CVT. In some instances, the starter motor can also double as a generator for generating and storing electricity while the ICE is operating above a speed or torque threshold. For instance, U.S. Pat. Pub. No. 2019/0153990 discloses the use of a starter/generator motor within its power train and as applicable to off-road vehicles and ATVs.

Particularly in the off-road operating environment that such vehicles are driven, the torque and speed ratios between the ICE and the wheels have very high ranges. For example, in some bad road or extrication environments, the torque requirements can be very high during quite low and medium speed travel and acceleration. On some occasions, the vehicles can be used in racing or relatively high speed/high acceleration trail conditions. In other occasions, the vehicles can be used in slow, gentle conditions where careful vehicle control is needed.

It is difficult to strike a good balance between both the power performance and the fuel economy throughout all operating conditions for such off-road vehicles. The relevant requirements of environmental protection laws and regulations are becoming increasingly more stringent, and emission standards exacerbate the difficulty of simultaneously attaining the desired power performance and fuel consumption. In some such vehicles, traditional ICE-only technology is giving way to hybrid vehicles, that include an electric drive motor to provide additional torque to the power train when desired. For instance, U.S. Pat. No. 7,520,351, incorporated by reference, describes such a hybrid power train for use on a motorcycle. At the same time, the relatively small size of the off-road vehicles as compared to street-legal automobiles leads to tight layouts and potentially cramped repair considerations. Better solutions are needed.

BRIEF SUMMARY OF THE INVENTION

In view of this, the present invention provides a hybrid power train structure for off-road vehicles (ATVs, UTVs and SSVs). The power train uses an internal combustion engine ("ICE") rotating a crankshaft through a continuously variable transmission ("CVT") as a primary source of locomotion torque, but also includes a driving/generator motor which, in certain established conditions, can either provide an additional or alternative source of locomotion torque or can harvest electricity from the torque created by the internal combustion engine. In one aspect, the driving/generator motor is an axial flux motor of small size for its relative torque output. In another aspect, the driving/generator motor is directly coupled to the CVT output shaft (which is also preferably the input shaft of the gearbox). Both aspects, as well as other aspects of the preferred systems, contribute to a hybrid power train structure which provides better power performance appropriate for such off-road vehicles as well as greater fuel economy, while minimizing drive train layout size constraint problems and reducing emission problems and noise, vibration and harshness.

BRIEF DESCRIPTION OF THE DRAWINGS

In FIGS. 1-4, reference numerals are as follows:
ICE crankshaft 1;
CVT driving pulley wheel 2, including:
   axially static driving pulley wheel portion 210;
   axially moving driving pulley wheel portion 220;
   mounting sleeve 221;
   the inner layer wheel body 222;
   pulley 223;
   outer layer wheel body 224;
   first reset part 225;
CVT belt 3;
integrated drive/generating motor 4;
vehicle power control unit 5;
CVT driven pulley wheel 6, including;
   cam plate 610;
   second reset part 620;
   axially moving driven pulley wheel portion 630
   axially static driven pulley wheel portion 640;
driven CVT shaft 7;
gear shift assembly 8;
electric battery 9;
drive shaft 10;

Figure 1:
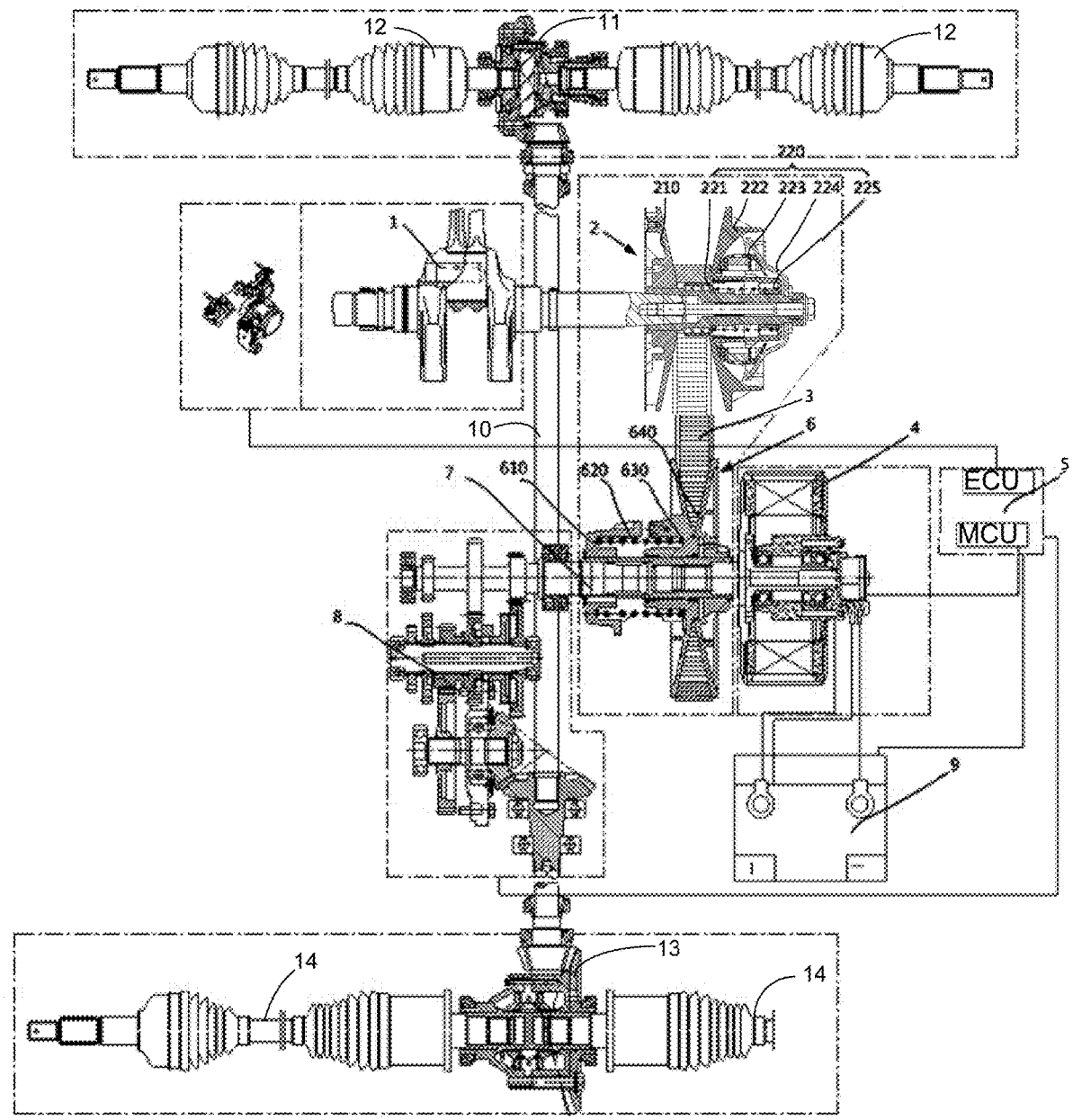
FIG. 1 is a schematic side view, partially in cross-section, showing the hybrid power train structure of a first preferred embodiment of the present invention.

front differential 11;
front half shafts 12;
rear differential 13;
rear half shafts 14;
starting/generator motor 15; and
hall effect sensor 16.

Figure 5:
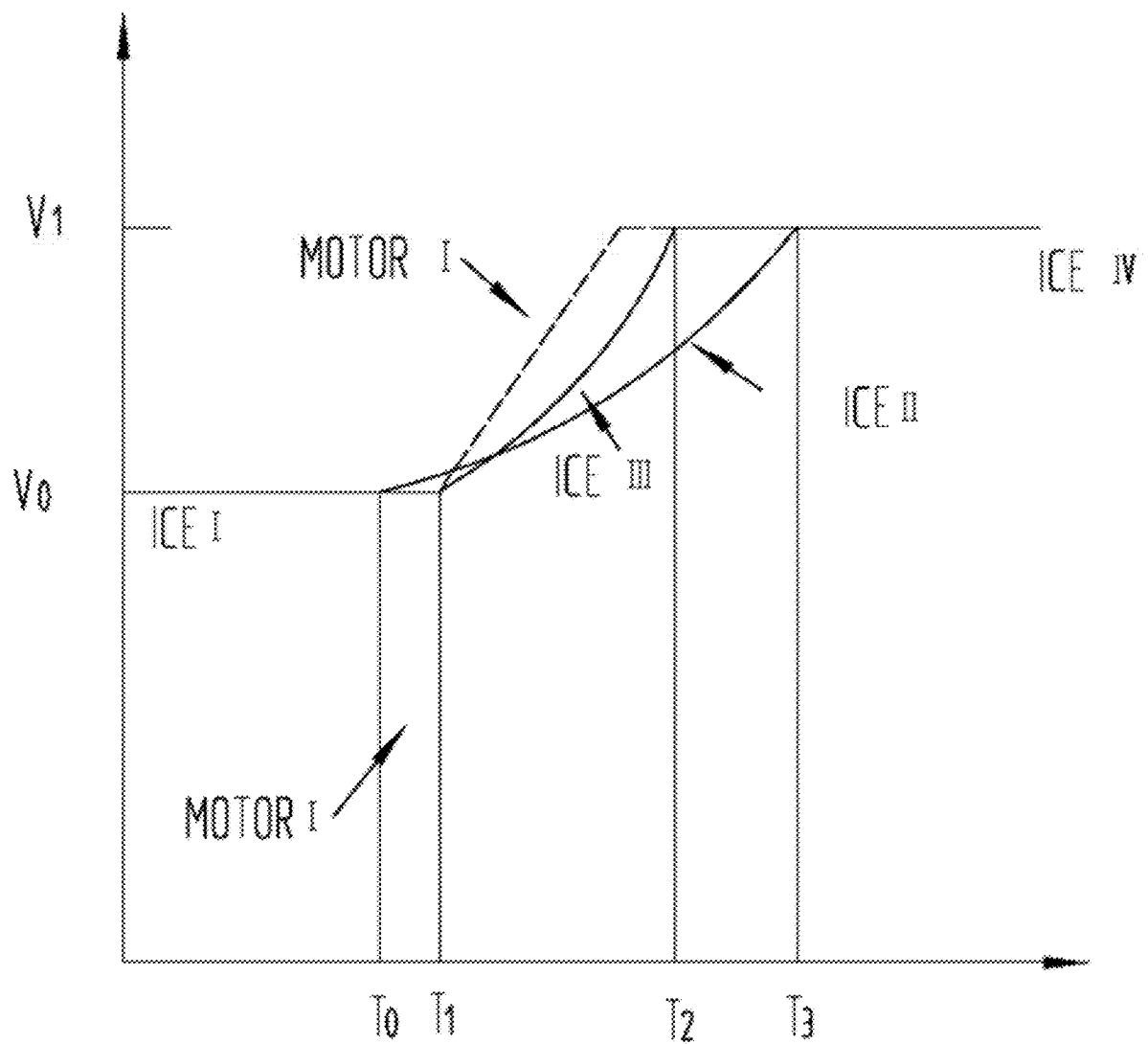

FIG. 5 is a graph explaining the timing of the additional torque and faster response provided in the control strategy of the preferred embodiments in accelerating from an initial velocity to an increased velocity.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

The present invention involves hybrid power train structure used in off-road vehicles such as ATVs, UTVs and SSVs. Such vehicles are smaller than the vast majority of four-wheeled, street-legal automobiles, such as having a vehicle width of 70 inches or less. Such vehicles are also commonly intended to be used over rough, unpaved surfaces.

The power train structure includes a one or two cylinder ICE providing its torque output on a crankshaft 1. The ICE operates under control of an engine control unit ("ECU") of a vehicle control unit 5. The torque output from the ICE is transmitted through a transmission system and a gear shift assembly 8 before being output to the vehicle drive shaft 10. For example, the gear shift assembly 8 may have aspects as taught in copending U.S. patent application Ser. Nos. 16/775,260 and 16/775,266, both incorporated by reference. The preferred embodiments are four wheel drive vehicles, and the drive shaft 10 provides torque to the front half shafts 12 (and therethrough to the front wheels, not shown) through the front differential 11, and to the rear half shafts 14 (and therethrough to the rear wheels, not shown) through the rear differential 13. For example, the drive shaft 10 may have aspects as taught in U.S. Pat. No. 10,618,350 incorporated by reference, the half shafts 12, 14 may have aspects as taught in U.S. Pat. No. 10,598,210 and in U.S. patent application Ser. Nos. 16/039,687 and 16/201,629, all three incorporated by reference, and the differentials 11, 13 may have aspects as taught in copending U.S. patent application Ser. Nos. 15/617,414, 16/039,471 and 16/004,474, all three incorporated by reference. The "front" and "rear" layout, as well as the right and left orientation, can be easily reversed and has no significance to the present invention.

Figure 2:
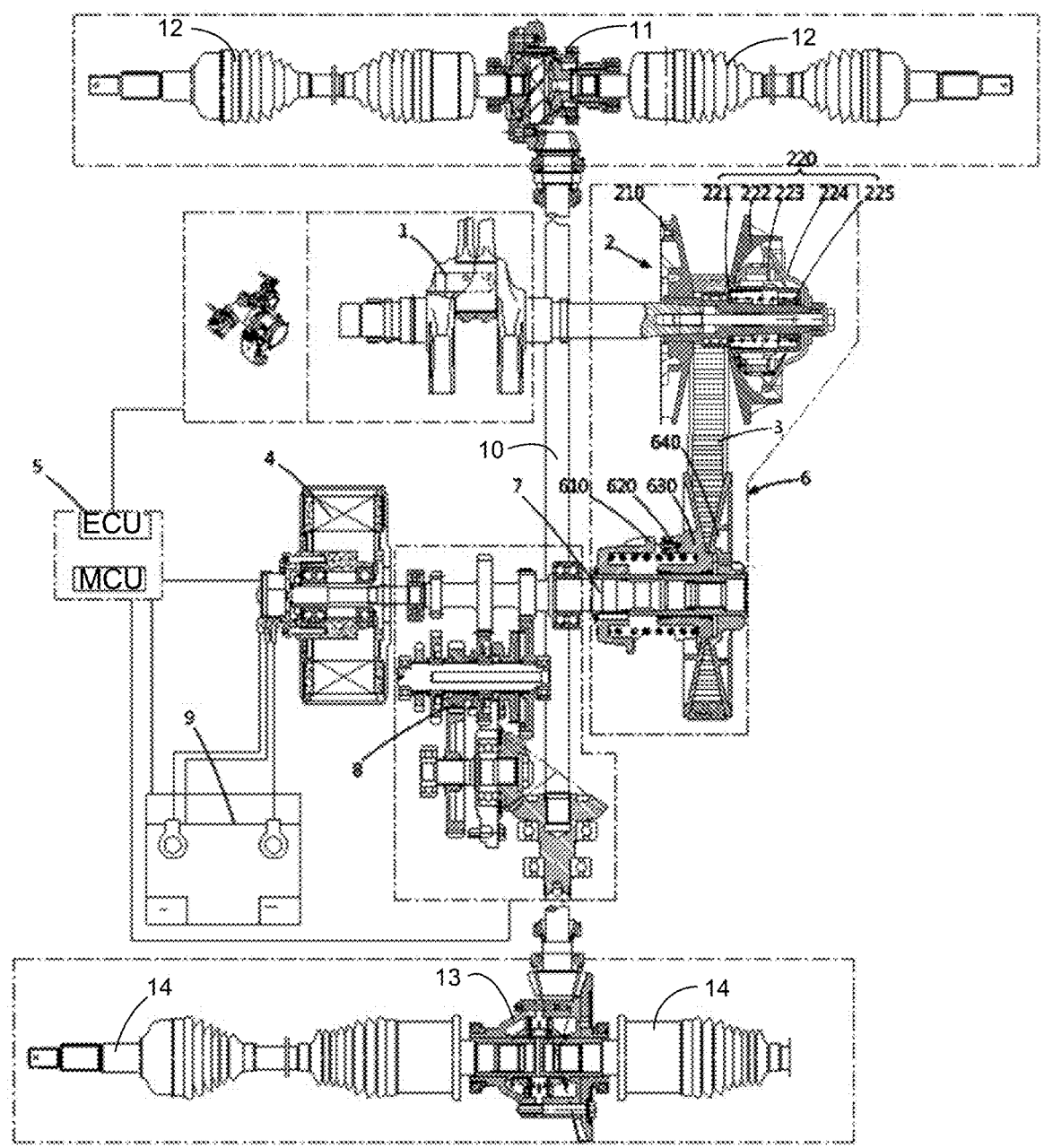
FIG. 2 is a schematic side view, partially in cross-section, showing the hybrid power train structure of a second preferred embodiment of the present invention.

The preferred embodiments all utilize a CVT as known in the art, including a driving pulley wheel 2, a CVT belt 3 and a driven pulley wheel 6. The driving pulley wheel 2 includes an axially moving driving pulley wheel portion 220, an axially static driving pulley wheel portion 210, a first reset part 225 and a spring pulley device with a pulley 223. Pulley wheel portions 220 and 210 are both coaxially installed on the ICE crankshaft 1. The axially moving driving pulley wheel portion 220 rides on a mounting sleeve 221 and has an inner layer wheel body 222 and an outer layer wheel body 224, all of which are coaxially arranged. The first reset part 225 is arranged between the mounting sleeve 221 and the inner layer wheel body 222. The spring pulley device is arranged between the inner layer wheel body 222 and the outer layer wheel body 224. When the rotation speed of the engine crankshaft 1 rises, the centrifugal force exerted on the pulley 223 of the spring pulley device become larger, so that the pulley 223 can overcome the pulling force of the spring to cause the inner layer wheel body 222 to move axially away from the outer layer wheel body 224 (to the left in FIGS. 1, 2 and 4). At this time the inner layer wheel body 222 compresses the first reset part 225 and pushes the continuously variable transmission belt 3, so the effective rotating radius of continuously variable transmission belt 3 at the driving pulley wheel 2 increases. Whereas, when the rotation speed of the engine crankshaft 1 decreases, the centrifugal force drops, so the pulley 223 will return under the action of the spring, and the first reset part 225 pushes the inner layer wheel body 222 to move towards the outer layer wheel body 224 (to the right in FIGS. 1, 2 and 4), the effective rotating radius of the CVT belt 3 at the driving pulley wheel 2 becomes smaller accordingly. The first reset part 225 moves the axially moving driving pulley wheel portion 220 axially to a reset position.

The CVT driven pulley wheel 6 includes a similar arrangement which works in opposite to the CVT driving pulley wheel 2. An axially moving driven pulley wheel portion 630 and an axially static driven pulley wheel portion 640 are both mounted on the driven shaft 7. A cam plate 610 is arranged on the outer side of the axially moving driven pulley wheel portion 630, mounted on the driven shaft 7 through a connecting key. A second reset part 620 is arranged between the cam plate 610 and the axially moving driven pulley wheel portion 630. In operation, whenever the inner layer wheel body 222 moves axially to the left to increase the effected rotating radius of the CVT belt 3 at the driving pulley wheel 2, the axially moving driven pulley wheel portion 630 moves axially to the right to decrease the effective rotating radius of the CVT belt 3 at the driven pulley wheel 6, thereby maintaining relatively consistent belt tension but changing the effective diameter ratio between the driving pulley wheel 2 and the driven pulley wheel 6 The above first reset part 225 and the second reset part 620 are preferably both compression springs.

Figure 3:
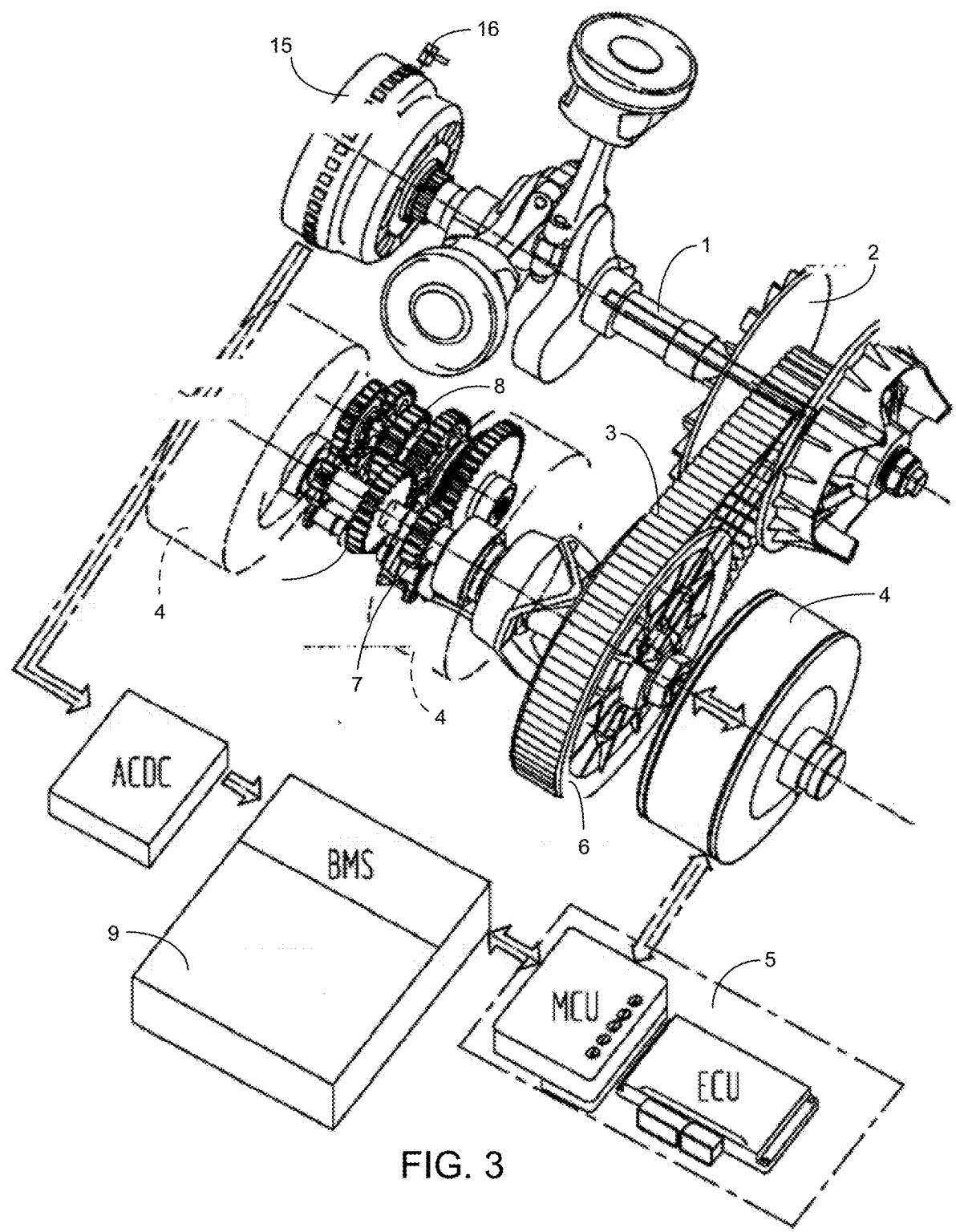
FIG. 3 is a perspective view showing the hybrid power train structure of FIG. 1, and also showing the hybrid power train structure of FIG. 2 (in dashed lines for the motor-generator 4), as well as showing (in dashed lines for the motor-generator 4) a third preferred embodiment of the present invention.

An integrated drive/generating motor 4 is included within the power train structure, controlled by a motor control unit ("MCU") of the vehicle power control unit 5. Electrical power is transmitted to and from the integrated drive/generating motor 4 and the vehicle's main battery 9 by wired connections. In the first preferred embodiment of FIG. 1, the integrated drive/generating motor 4 is coaxially mounted and connected to one end of the driven shaft 7, outside the CVT driven pulley 6. In the second preferred embodiment of FIG. 2, the integrated drive/generating motor 4 is coaxially mounted and connected to the other end of the driven shaft 7, past the gear shift assembly 8. In the third preferred embodiment (shown only in dashed lines in FIG. 3), the integrated drive/generating motor 4 is coaxially mounted and connected to the driven shaft 7 between the CVT driven pulley 6 and the gear shift assembly 8. Thus, in the hybrid power structure of the all-terrain vehicle provided by the first, second and third embodiments of the present invention, the integrated drive/generating motor 4 is directly connected to the CVT driven shaft 7. In each of these preferred embodiments, a separate starter/generator motor 15 (shown in FIG. 3) is provided for the crankshaft 1 used when starting the ICE.

Figure 4:
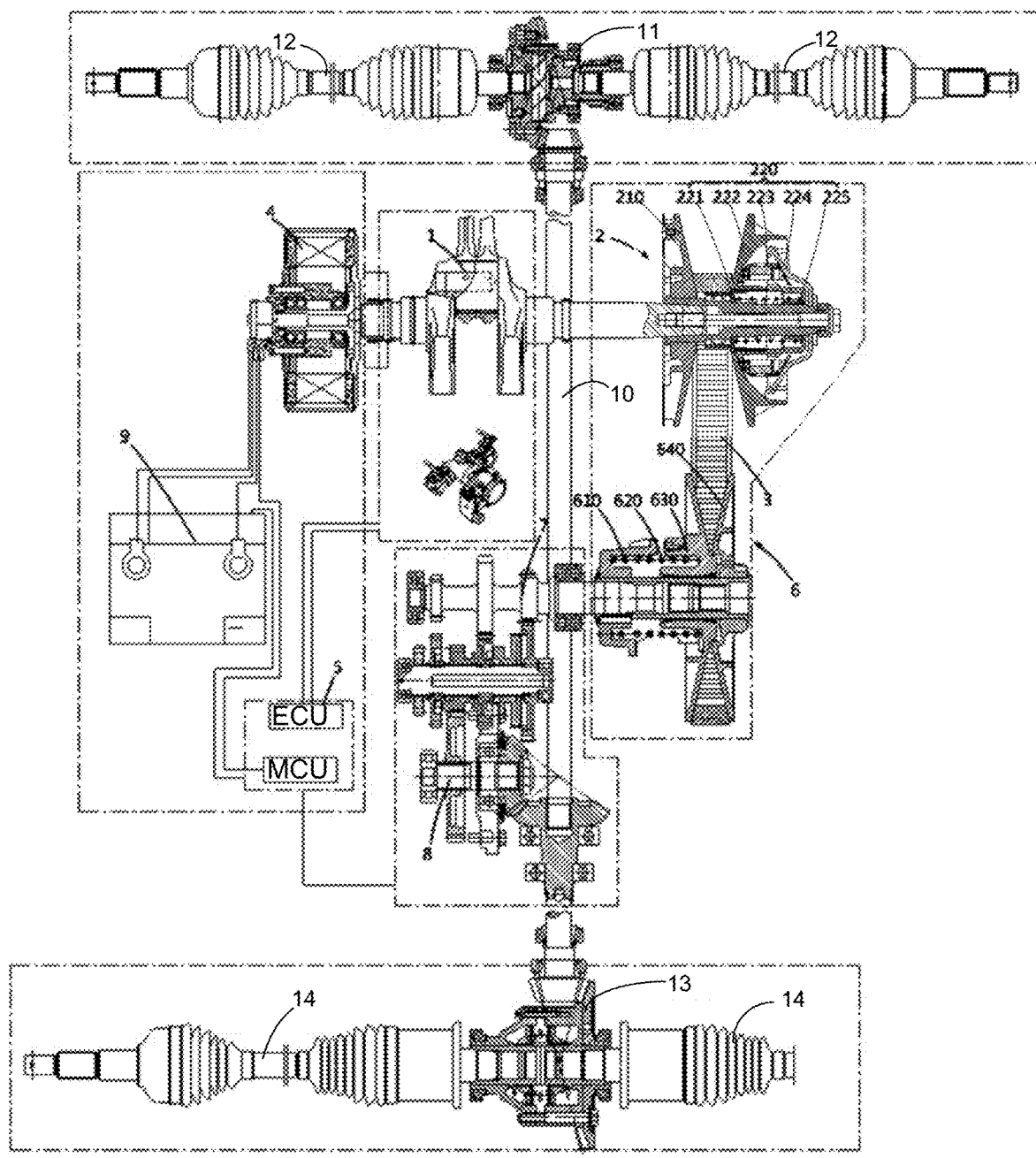
FIG. 4 is a schematic side view, partially in cross-section, showing the hybrid power train structure of a fourth preferred embodiment of the present invention.

In a fourth preferred embodiment shown in FIG. 4, the integrated starting/drive/generating motor 4 is coaxially mounted and connected to one end of the crank shaft 1, opposite the ICE from the CVT. In this location, the integrated starting/generating motor 4 completely replaces the starter/generator motor 15.

In the first three embodiments, based on the crankshaft rotational speed as determined by a hall effect sensor 16, in conjunction with the throttle pedal/lever position call for power, the vehicle power control unit 5 matches the rotational speed range of the integrated drive/generating motor 4 with the rotational speed of driven shaft 7. As a result, motor 4 can not only be used as a driving motor to realize independent electric driving and increase torque of power system, but also can be used as a generator to recycle surplus kinetic energy. The vehicle power control unit 5 controls the rotational speed of integrated drive/generating motor 4 to apply additional torque directly on the driven shaft 7, which is a simple and fast process, which can realize a shorter response time when switching the drive mode from ICE drive to hybrid drive and back again. By a direct, clutchless connection between the motor 4 and the driven shaft 7, engagement and disengagement of the motor 4 (including switching between torque-supplying and power harvesting modes) is accomplished with minimal noise, vibration and harshness. The ability to use the motor 4 as both to directly drive the vehicle and as a generator, and to quickly switch between modes, allows fuel consumption and pollutant emission to be reduced, and allows the vehicle to obtain better performance in its wide range of working conditions. In the fourth embodiment, the integrated drive/generating motor 4 is directly on the crankshaft 1, and can likewise be used to either drive the vehicle through torque addition on the crankshaft 1 or to harvest power from the kinetic energy of the crankshaft 1.

The size of the motor 4 is very important for a suitable power train for ATVs, UTVs and SSVs. No matter the transverse or longitudinal location, the size in the axial direction is very limited in such power trains. The preferred embodiments use a motor 4 which is 250 mm or less in diameter, and which is 150 mm or less, and more preferably 100 mm or less, in axial length. Despite its small size, the preferred motor 4 still outputs at least 25 N*m of maximum output torque The axial length of the ICE crankshaft 1 and/or CVT output shaft 7/gearbox 8 in ATVs will affect the rider's space between legs or foot. For UTVs and SSVs, the axial length of the ICE crankshaft 1 and/or CVT output shaft 7/gearbox 8 affects the distance from back of seat to center of rear axle.

In the preferred embodiments, the motor 4 is an axial flux motor to achieve a smaller axial size while still satisfying the vehicle performance requirements. The axial flux motor 4 places permanent magnets on the face of the rotor, and offsets the stator axially from the rotor, opposite one of the sides of the rotor. To balance the magnetic forces, two rotors are often used-one on either side of the stator. The preferred axial flux motor 4 is lightweight, compact, and relatively powerful. The preferred axial flux motor 4 can achieve high power even at very low rotation speeds due to very high torque, which allows a gearless drive on the CVT output shaft 7. The axial flux motor 4 can continuously apply additional torque to its shaft 7 to increase the vehicle's power performance (by matching the axial flux motor rotating speed relative to the crankshaft rotating speed). The most preferred axial flux motor 4 is an EMRAX 188 high voltage motor, having a diameter of about 190 mm and an axial length of about 80 mm. This most preferred motor 4 provides a maximum output torque of about 90 N*m and continuous output torque of about 50 N*m, at an efficiency of 92-98%.

In the preferred CVT, torque cannot be reversely transferred from the driven pulley wheel 6 to the driving pulley wheel 2. This eliminates the possibility of the integrated drive/generating motor 4 pulling the crankshaft 1 of the ICE when the vehicle is in a pure electric driving mode in the first three embodiments. Reverse transfer of torque to the crankshaft 1 can alternatively be prevented by adding a one-way clutch (not shown) between the CVT driving pulley wheel 2 and the crankshaft 1. In the fourth embodiment, use of the integrated starting/drive/generating motor 4 necessarily rotates the crankshaft 1.

The vehicle power control unit 5 operates the power train in any of four modes, as follows:

In most common or gentle operating conditions, the vehicle power control unit 5 causes the drive/generating motor 4 to provide no function. The ICE is sized and controlled by the ECU of the vehicle power control unit 5 for maximum fuel efficiency and to minimize exhaust emissions. During this standard ICE mode of operation in the first three embodiments, the generator motor 15 can be used to constantly charge the battery 9, such as through an AC to DC converter ("ACDC").

During normal driving, the vehicle power control unit 5 will frequently switch to cause the drive/generating motor 4 to operate in a power harvesting mode, in which the integrated drive/generating motor 4 converts the torque of the ICE into electrical energy which is then transmitted and stored in the power battery 9 (in addition to any electric power being harvested by the starting/generator motor 15. The most preferred control scheme switches the drive/generating motor 4 into power harvesting mode a) during idling; b) during braking, and c) when the battery charge state value is low. An alternative control scheme senses when the vehicle is traveling downhill and switches into power harvesting mode when the downhill slope exceeds a certain threshold (such as a downhill grade of 5 or more).

Occasionally, the vehicle power control unit 5 will switch into a hybrid driving mode, which causes the drive/generating motor 4 to operate in conjunction with the ICE to provide the driving torque for the vehicle. The ICE torque and the torque integrated drive/generating motor 4 are dynamically coupled on the driven shaft 7 (in the first three embodiments) in a hybrid driving mode, with both the ICE and the motor 4 providing positive torque. The hybrid driving mode is used when the power control unit 5 senses low-speed, high-torque operating conditions, such as, extricating from mud, or low-speed climbing over boulders, logs and so on, or during high initial acceleration such as from a stop. In this hybrid driving mode, the wheel system obtains greater torque and excellent power performance, despite using an ICE sized for maximum fuel efficiency and minimal exhaust emissions.

It should be noted that the preferred vehicle power control unit 5 can switch into the hybrid drive mode in certain mechanical failure conditions. For instance, the CVT belt 3 could mechanically fail, or a connection or clutch between the crankshaft 1 and the CVT driving pulley wheel 2 could mechanically fail. In such mechanical failure conditions, even with the ICE operating, there is no torque transfer from the crankshaft 1 to the driven shaft 7. Instead, the crankshaft 1 will merely supply power to the generator motor 15, which converts the kinetic energy of the crankshaft 1 into electricity for supply through the battery 9 and its battery management system ("BMS") to the drive motor 4. In such occasions of mechanical failure, even though the vehicle power control unit 5 is controlling the system in the hybrid drive mode, the drive motor 4 provides 100% of the torque for propelling the vehicle. Thus, in the first three embodiments, the hybrid drive mode can be used for the vehicle to "limp home" back to a repair shop to fix the mechanical failure. Because the generator motor 15 is still providing electrical power (constantly recharging the battery 9), the "limp home" can continue over an extended distance—much greater than the electrical capacity of the battery 9 to drive the vehicle by itself—such as if the mechanical failure occurs far out into the bush.

In certain normal operating conditions, the vehicle power control unit 5 causes the vehicle to operate in a pure electric driving mode. In the pure electric driving mode, the ICE is kept from starting, and the integrated drive/generating motor 4 outputs the entirety of the torque for the power train and for locomotion of the vehicle. The pure electric driving mode is used in conditions such as when the vehicle is too cold to start, or when the catalyst temperature is too low for emission requirements and so on.

FIG. 5 shows the velocity and acceleration timing associated with the present invention. The graph starts with the vehicle travelling at constant velocity $V_0$. The drive/generating motor 4 might be harvesting power, but more commonly would be controlled to provide no function. The vehicle is thus traveling on the ICE I line, with the power of the ICE providing 100% of the opposing driving load. Time $T_0$ designates the time when the vehicle operator increases the gas pedal or throttle lever input, essentially asking for an increase in target vehicle speed to $V_1$. The amount that $V_1$ differs from $V_0$ depends upon how far the operator changes the position of the gas pedal or throttle lever.

If the vehicle were operated solely in the normal ICE mode, then ICE II represents the velocity curve followed by the vehicle to get from initial velocity $V_0$ to desired/increased velocity $V_1$. The increased torque output of the ICE under control of the ECU of the vehicle control unit 5 accelerates the vehicle. The vehicle reaches the desired/increased velocity $V_1$ at time $T_3$.

In contrast, for most changes from $V_0$ to $V_1$ requested by the operator, the vehicle control unit 5 will change into the hybrid mode. The motor control unit ("MCU") of the vehicle control unit 5 drives the motor 4 from no-load state to a load state at time $T_1$, when the torque output of the motor 4 as directly applied on the CVT output shaft 7 adds to the torque output from the ICE. The dashed curve MOTOR I designates that time it would take for the motor 4 to accelerate from $V_0$ to $V_1$ without a vehicle load (i.e., under no load conditions), but of course additional time is necessary due to the vehicle load being driven. From time $T_1$ to time $T_2$, as shown by curve ICE III, the vehicle velocity change from initial velocity $V_0$ to desired/increased velocity $V_1$ occurs rapidly due to the lighter load on the ICE when the torque from the motor 4 shares part of the vehicle load. Once the vehicle reaches the desired/increased velocity $V_1$ at time $T_2$, the MCU of the vehicle control unit 5 stops powering the motor 4, and the vehicle returns to its normal operation at velocity $V_1$ and under 100% ICE power as designated by the line ICE IV. The hybrid mode thus decreases the time from $V_0$ to $V_1$, using a smaller, more fuel efficient ICE than could otherwise be achieved.

In the fourth embodiment, the ECU of the vehicle power control unit 5 also includes an automatic starting and stopping routine. The starting and stopping routine is used to control the ICE to stop when the engine is in a idle state and the vehicle is not travelling for a preset duration. The MCU of the vehicle power control unit 5 controls the said integrated starting/generating motor 4 to start the ICE after the vehicle power control unit 5 receives a throttle signal and other command signals (such as, but not limited to, a new braking signal after the vehicle has stopped travelling).

Although the present invention has been described with reference to preferred embodiments, workers skilled in the art will recognize that changes may be made in form and detail without departing from the spirit and scope of the invention.

The invention claimed is:

1. A hybrid power train structure for an off-road vehicle, comprising:
    an internal combustion engine causing rotation of a crankshaft;
    a continuously variable transmission powered by rotation of the crankshaft to output power on a CVT output shaft, with a CVT driven pulley wheel mounted on the CVT output shaft such that the CVT output shaft outputs torque always at the rotational speed of the CVT driven pulley wheel, the CVT driven pulley wheel having an effective diameter which is continuously variable, wherein the continuously variable transmission further comprises:
        a CVT driving pulley wheel mounted on the crankshaft, the CVT driving pulley wheel having an effective diameter which is continuously variable; and
        a CVT belt riding on the CVT driving pulley wheel and the CVT driven pulley wheel to transfer torque from the crankshaft to the CVT output shaft;
    a driving/generator motor coaxially mounted and directly connected to the CVT output shaft in a clutchless connection such that the driving/generator motor is driven or drives always at the rotational speed of the CVT driven pulley wheel, the driving/generator motor operating under control of a vehicle power control unit to operate optionally in a hybrid mode wherein torque from the driving/generator motor is added to torque from the internal combustion engine, or in a power harvesting mode which generates electricity from torque on the CVT output shaft; and
    a drive shaft powered by torque from the CVT output shaft for locomotion of the off-road vehicle.

2. The hybrid power train structure of claim 1, wherein the driving/generator motor directly coupled to the CVT output shaft is an axial flux motor.

3. The hybrid power train structure of claim 2, wherein the axial flux motor is 250 mm or less in diameter and 150 mm or less in axial length, and can provide torque of 25 N*m or more.

4. The hybrid power train structure of claim 1, wherein the vehicle power control unit places the driving/generator motor into the power harvesting mode a) during idling; b) during braking, and c) when a battery charge state value is low.

5. The hybrid power train structure of claim 1, wherein the vehicle power control unit places the driving/generator motor into the power harvesting mode when sensed downhill slope of the vehicle exceeds a threshold.

6. The hybrid power train structure of claim 1, wherein the vehicle power control unit can operate the driving/generator motor in a pure electric mode, to output torque on the CVT output shaft for locomotion of the off-road vehicle while the internal combustion engine is off and the crankshaft is not rotating.

7. The hybrid power train structure of claim 6, further comprising a separate generator motor coupled to the crankshaft, wherein the vehicle power control unit can operate the driving/generator motor in the hybrid mode while the internal combustion engine is running and the crankshaft is rotating even if a mechanical failure prevents torque transfer from the crankshaft to the CVT output shaft.

8. The hybrid power train structure of claim 1, wherein the driving/generator motor is an axial flux motor.

9. The hybrid power train structure of claim 8, wherein the continuously variable transmission comprises a CVT driven pulley wheel mounted on the CVT output shaft such that the CVT output shaft outputs torque always at the rotational speed of the CVT driven pulley wheel, the CVT driven pulley wheel having an effective diameter which is continuously variable, wherein the axial flux motor is 250 mm or less in diameter and 150 mm or less in axial length, and can provide torque of 25 N*m or more, and is coaxially mounted and directly connected to the CVT output shaft in a clutchless connection such that the driving/generator motor is driven or drives always at the rotational speed of the CVT driven pulley wheel.

10. The hybrid power train structure of claim 8, wherein the axial flux motor can be operated by the vehicle power control unit to turn the crankshaft for starting of the internal combustion engine.

11. The hybrid power train structure of claim 10, wherein the vehicle power control unit has an automatic starting and stopping routine used to control the internal combustion engine to stop when the vehicle is not travelling for a preset duration.

12. The hybrid power train structure of claim 11, wherein the vehicle power control units uses the axial flux motor to start the internal combustion engine after the vehicle power control unit receives a throttle signal.

13. A hybrid power train structure for an off-road vehicle, comprising:
   an internal combustion engine causing rotation of a crankshaft;
   a continuously variable transmission powered by rotation of the crankshaft to output power on a CVT output shaft, with a CVT driven pulley wheel mounted on the CVT output shaft such that the CVT output shaft outputs torque always at the rotational speed of the CVT driven pulley wheel, the CVT driven pulley wheel having an effective diameter which is continuously variable;
   a driving/generator motor coaxially mounted and directly connected to the CVT output shaft in a clutchless connection such that the driving/generator motor is driven or drives always at the rotational speed of the CVT driven pulley wheel, the driving/generator motor operating under control of a vehicle power control unit to operate optionally in a hybrid mode wherein torque from the driving/generator motor is added to torque from the internal combustion engine, or in a power harvesting mode which generates electricity from torque on the CVT output shaft, wherein the driving/generator motor directly coupled to the CVT output shaft is an axial flux motor which is 250 mm or less in diameter and 150 mm or less in axial length, and can provide torque of 25 N*m or more; and
   a drive shaft powered by torque from the CVT output shaft for locomotion of the off-road vehicle;
wherein the internal combustion engine is a one or two cylinder engine, with an axial length of the CVT output shaft combined with the axial length of the axial flux motor affecting either a) a rider's space between legs or feet; or b) a distance from a back of a seat to a center of a rear axle.

14. The hybrid power train structure of claim 13, wherein the drive shaft powers a four wheel drive vehicle having a vehicle width of 70 inches (1778 mm) or less.

15. A hybrid power train structure for an off-road vehicle, comprising:
   an internal combustion engine causing rotation of a crankshaft;
   a continuously variable transmission powered by rotation of the crankshaft to output power on a CVT output shaft, with a CVT driven pulley wheel mounted on the CVT output shaft such that the CVT output shaft outputs torque always at the rotational speed of the CVT driven pulley wheel, the CVT driven pulley wheel having an effective diameter which is continuously variable;
   a driving/generator motor coaxially mounted and directly connected to the CVT output shaft in a clutchless connection such that the driving/generator motor is driven or drives always at the rotational speed of the CVT driven pulley wheel, the driving/generator motor operating under control of a vehicle power control unit to operate optionally in a hybrid mode wherein torque from the driving/generator motor is added to torque from the internal combustion engine, or in a power harvesting mode which generates electricity from torque on the CVT output shaft, wherein the vehicle power control unit can operate the driving/generator motor in a pure electric mode, to output torque on the CVT output shaft for locomotion of the off-road vehicle while the internal combustion engine is off and the crankshaft is not rotating, wherein the vehicle power control unit places the driving/generator motor into pure electric mode when the vehicle is too cold to start, or when catalyst temperature is too low for emission requirements; and
   a drive shaft powered by torque from the CVT output shaft for locomotion of the off-road vehicle.

16. A hybrid power train structure for an off-road vehicle comprising:
   an internal combustion engine causing rotation of a crankshaft;
   a continuously variable transmission powered by rotation of the crankshaft to output power on a CVT output shaft;
   a driving/generator motor directly coupled to the CVT output shaft, operating under control of a vehicle power control unit to operate optionally in a hybrid mode wherein torque from the driving/generator motor is added to torque from the internal combustion engine, or in a power harvesting mode which generates electricity from torque on the CVT output shaft;
   a gear shift assembly powered by the CVT output shaft;
   a drive shaft powered by the gear shift assembly; and
   a differential powered by the drive shaft.

17. A hybrid power train structure for an off-road vehicle, comprising:
   an internal combustion engine causing rotation of a crankshaft;
   a continuously variable transmission powered by rotation of the crankshaft to output power on a CVT output shaft, with a CVT driven pulley wheel mounted on the CVT output shaft such that the CVT output shaft outputs torque always at the rotational speed of the CVT driven pulley wheel, the CVT driven pulley wheel having an effective diameter which is continuously variable;

a driving/generator motor coaxially mounted and directly connected to the CVT output shaft in a clutchless connection such that the driving/generator motor is driven or drives always at the rotational speed of the CVT driven pulley wheel, the driving/generator motor operating under control of a vehicle power control unit to operate optionally in a hybrid mode wherein torque from the driving/generator motor is added to torque from the internal combustion engine, or in a power harvesting mode which generates electricity from torque on the CVT output shaft;

a drive shaft powered by torque from the CVT output shaft for locomotion of the off-road vehicle; and a sensor which senses rotational speed of the crankshaft, wherein the vehicle power control unit uses information of the rotational speed of the crankshaft, when switching into the hybrid mode, to cause the driving/generator motor to initially match the speed of the CVT output shaft before the driving/generator motor provides positive torque to the CVT output shaft.

18. The hybrid power train structure of claim 17, wherein the continuously variable transmission further comprises:

a CVT driving pulley wheel mounted on the crankshaft, the CVT driving pulley wheel having an effective diameter which is continuously variable; and a CVT belt riding on the CVT driving pulley wheel and the CVT driven pulley wheel to transfer torque from the crankshaft to the CVT output shaft.

19. A hybrid power train structure for an off-road vehicle, comprising:

an internal combustion engine causing rotation of a crankshaft;

a continuously variable transmission powered by rotation of the crankshaft to output power on a CVT output shaft; and a driving/generator motor operating under control of a vehicle power control unit to operate optionally in a hybrid mode wherein torque from the driving/generator motor is added to torque from the internal combustion engine, or in a power harvesting mode which generates electricity from torque from the internal combustion engine, wherein the driving/generator motor is an axial flux motor, wherein the axial flux motor can be operated by the vehicle power control unit to turn the crankshaft for starting of the internal combustion engine;

wherein torque from the CVT output shaft causes locomotion of the off-road vehicle;

wherein the vehicle power control unit has an automatic starting and stopping routine used to control the internal combustion engine to stop when the vehicle is not travelling for a preset duration; and wherein the vehicle power control units uses the axial flux motor to start the internal combustion engine after the vehicle power control unit receives a new braking signal after the vehicle has stopped travelling.

\* \* \* \* \*